United States Patent [19]

Malloy et al.

[11] Patent Number: 5,149,307
[45] Date of Patent: Sep. 22, 1992

[54] MULTISPEED POWER TRANSMISSION

[75] Inventors: John D. Malloy; Michael B. Solt, both of Troy, Mich.

[73] Assignee: General Motors Corporation, Detroit, Mich.

[21] Appl. No.: 776,021

[22] Filed: Oct. 15, 1991

[51] Int. Cl.$^5$ .............................................. F16H 37/08
[52] U.S. Cl. .................................. 475/200; 475/198; 475/206
[58] Field of Search .................. 475/206, 200, 198

[56] References Cited

U.S. PATENT DOCUMENTS

| 2,796,942 | 6/1957 | Hill | 475/200 X |
| 2,844,973 | 7/1958 | Hill | 475/200 X |
| 3,113,471 | 12/1963 | Gregory | 475/200 |
| 4,611,504 | 9/1986 | Rundle | 475/206 X |
| 4,907,472 | 3/1990 | Mura | 475/206 X |

Primary Examiner—Dirk Wright
Attorney, Agent, or Firm—Donald F. Scherer

[57] ABSTRACT

A multispeed power transmission has an input shaft, a pair of parallel transfer shafts, a differential gear set and a pair of output shafts. The output shafts extend from opposite sides of the differential gear set and are disposed coaxial with one of the transfer shafts and the input shaft. An output gear set is connected for torque transfer between the other transfer shaft and the differential gear set. A plurality of clutch controlled ratio gears sets are connectible between the transfer shafts to provide selective gear ratios therebetween. A direct clutch provides selective connection between the one transfer shaft and the differential gear set in bypass relation with the output gear set. A forward clutch is selectively operable in combination with the clutch controlled ratio gear sets and a direct clutch to provide a plurality of drive paths between the input shaft and the differential gear set. A clutch controlled reverse gear set is selectively operable to provide a reversing drive path between the input shaft and the differential gear set.

2 Claims, 3 Drawing Sheets

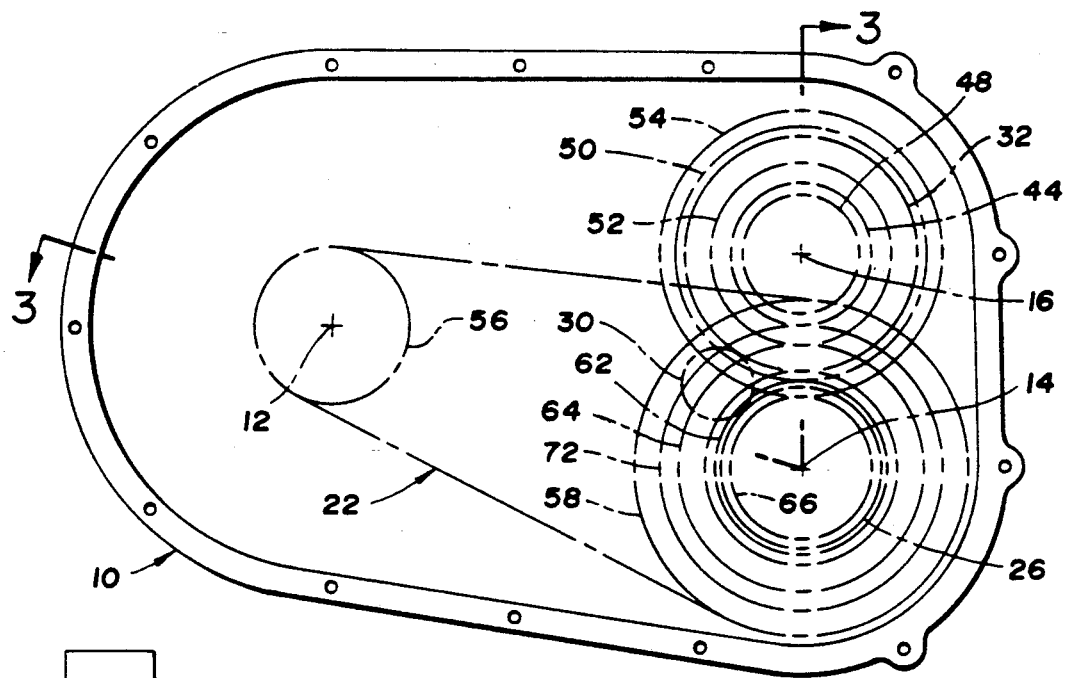
Fig. 1
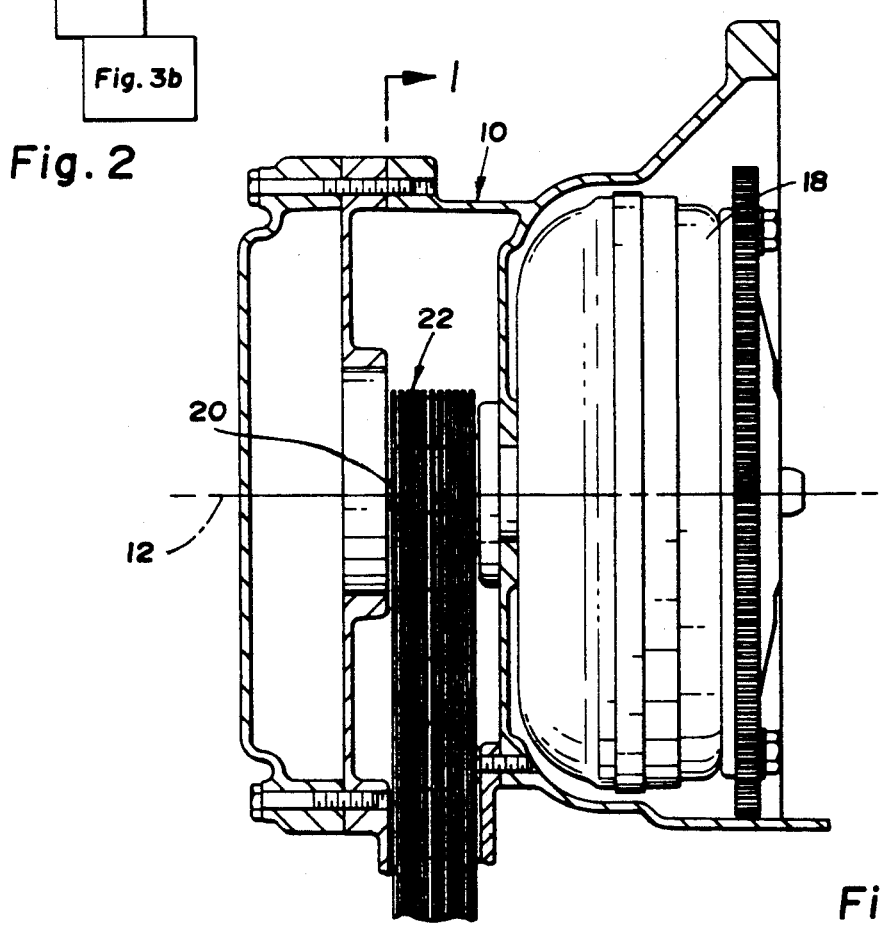
Fig. 2
Fig. 3a
Fig. 3a
Fig. 3b

MULTISPEED POWER TRANSMISSION

BACKGROUND OF THE INVENTION

This invention relates to power transmissions, and more particularly, to power transmissions having two or more transfer shafts disposed in parallel relation between an input shaft and an output shaft.

Specifically, this invention relates to power transmissions having a direct connection between one transfer shaft and an output differential and a gear reduction drive between another transfer shaft and the output differential.

Prior art transmissions of the countershaft type have the differential and countershaft disposed on separate axes which generally requires additional vertical space to accommodate the transmission and the differential housing. Also, with these structures, all of the gear ratios which are connectible between the input shaft and transfer shafts are modified by a final drive ratio which is disposed between the transfer shaft and the differential.

SUMMARY OF THE INVENTION

It is an object of this invention to provide an improved power transmission having a plurality of transfer shafts, one of which is coaxial with an input shaft, an output differential and a pair of output shafts and another of which is connected with the output differential through a gear reduction ratio.

It is another object of this invention to provide an improved power transmission having a plurality of transfer shafts, one of which is coaxial with and selectively directly drivingly connectible between an input shaft and an output differential.

It is yet another object of this invention to provide an improved power transmission as set forth above, wherein a reverse ratio gear and clutch arrangement is selectively operable to provide a reversing ratio between the input and output shafts via one of the transfer shafts, the final gear reduction ratio and the differential, and also wherein a forward clutch and a plurality of clutch controlled forward ratio gears are selectively operable to provide a plurality of gear ratios between the input shaft and the output shafts via the two transfer shafts, the gear reduction ratio and the differential, and further wherein, the forward clutch and a direct clutch are operable in combination to connect the input shaft directly with the differential via the coaxial transfer shaft.

DESCRIPTION OF THE DRAWINGS

FIG. 1 is a view taken along line 1—1 of FIGS. 3a and 3b depicting the centerlines of the torque converte and the shaft axis.

FIG. 2 is a block diagram showing the positioning of FIGS. 3a —3b.

FIGS. 3a and 3b are sectional views taken along line 3—3 of FIG. 1.

DESCRIPTION OF AN EMBODIMENT

Figure 3B:
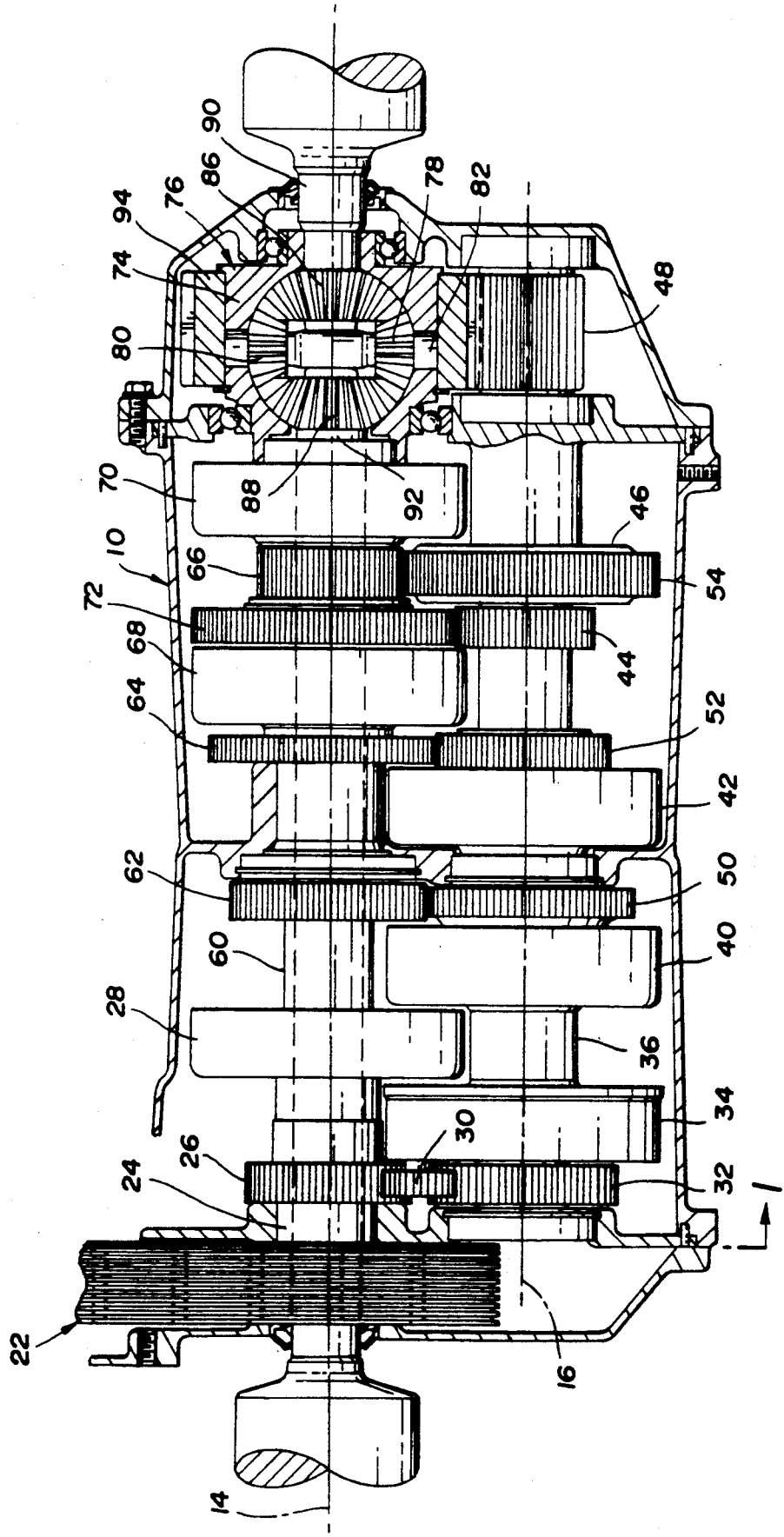

Referring to the drawings, wherein like characters represent the same or corresponding parts throughout the several views, there is seen in FIG. 1, an end view of a transmission casing 10 in which is located a torque converter axis 12, an input/output axis 14 and a transfer shaft axis 16.

The axis 12, as seen in FIG. 3a, has rotatably supported thereon, a conventional torque converter 18 and a torque converter output shaft 20 providing a drive connection with a conventional chain and sprocket drive, generally designated 22.

As seen in FIG. 3b, the chain and sprocket drive 22 is also rotatably mounted about the input axis 14 at which location the chain and sprocket mechanism 22 is directly connected with a transmission input shaft 24. The input shaft 24 is drivingly connected with a reversing input gear 26 and forward clutch input member 28.

The reverse input gear 26 is disposed in mesh with a reverse idler gear 30, which in turn, meshes with a reverse output gear 32, which in turn, is drivingly connected with a conventional fluid operated clutch 34. The reverse gear 32 and the clutch 34 are rotatably supported on the transfer shaft axis 16. The clutch 34 is drivingly connected with a transfer shaft 36 such that during engagement of the clutch 34, the transfer shaft 36 will be driven opposite to the input shaft 24 through the reverse ratio gear arrangement comprised of the gears 26, 30 and 32.

Figure 4:
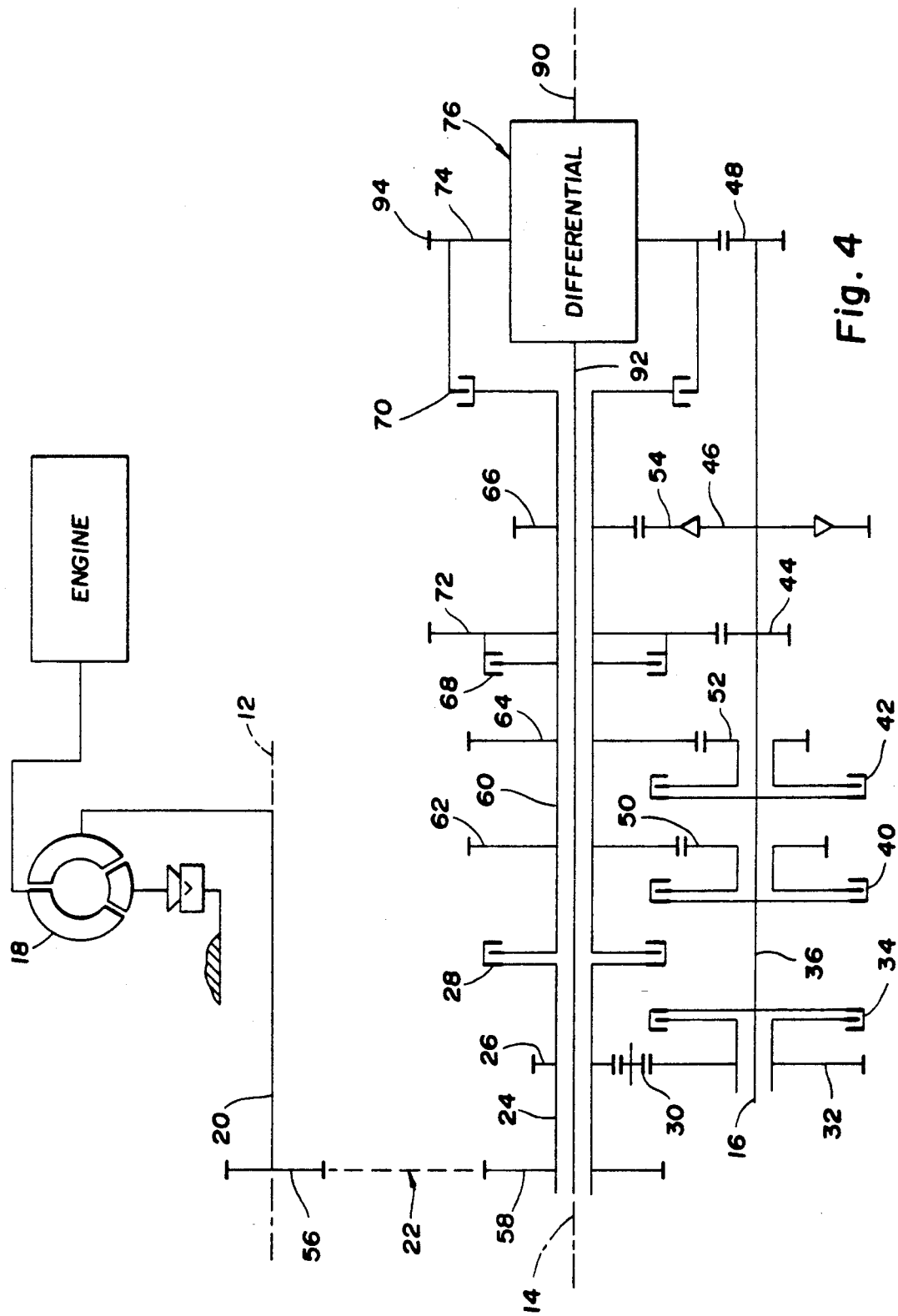
FIG. 4 is a schematic representation of a transmission incorporating the present invention.

The transfer shaft 36, as best seen in the schematic diagram of FIGS. 3b and 4, extends the full length of the transmission and has drivingly connected therewith a second ratio clutch 40, a third ratio clutch 42, a fourth ratio output gear 44, an overrunning or one-way clutch 46, and an output gear 48. The clutches 40 and 42 are conventional fluid operated clutches and are drivingly connected to a second ratio output gear 50 and a third ratio output gear 52, respectively. The one-way clutch 46 is a well-known component and has a first ratio output gear 54 drivingly connected thereto. The transfer shaft 36 is supported in the casing 10 with conventional antifriction bearings.

As seen in FIGS. 1 and 4, the chain and sprocket drive 22 has an input sprocket 56 drivingly connected with the shaft 20 and an output sprocket 58 drivingly connected with the input shaft 24.

A transfer shaft 60 is disposed in the transmission casing 10 in coaxial relationship with the input shaft 24 and is rotatably supported by conventional bearings on the axis 14. The forward clutch 28 is connected with the shaft 60 such that during engagement thereof, the transfer shaft 60 will rotate in unison with the input shaft 24.

The transfer shaft 60 has drivingly connected thereto a second ratio input gear 62, a third ratio input gear 64, a first ratio input gear 66, a fourth ratio clutch 68 and a direct clutch 70. The fourth ratio clutch 68 is a conventional fluid operated friction clutch which has drivingly connected therewith a fourth ratio input gear 72. The direct clutch 70 is a conventional fluid operated friction device which has connected thereto a carrier 74 of a differential gear set 76.

The differential gear set 76 is a conventional differential type device including a pair of pinion gears 78 and 80 which are rotatably mounted on a pin 82 secured in the carrier 74. Rotatably supported in the carrier 74 and disposed in meshing relation with the pinion gears 78 and 80, is a pair of side gears 86, 88 which are drivingly connected to a pair of output shafts 90 and 92, respectively. The output shaft 92 extends leftward, as viewed in FIGS. 4 and 3b through the center of the transfer shaft 60 and the input shaft 24. The output shaft 90 extends rightward from the transmission casing and is disposed for coaxial rotation with the output shaft 92, the transfer shaft 60 and the input shaft 24.

The carrier 74 has secured thereto an output gear 94 which is disposed in meshing relation with the output gear 48. The output gear 48 and output gear 94 cooperate to provide a reduction ratio between the transfer shaft 36 and the differential carrier 74.

This reduction ratio is commonly known as the final drive ratio in an automotive transmission. The final drive ratio multiplies the torque transmission provided during the first through fourth forward gear ratios and during the reverse gear ratio. To establish the first forward gear ratio, the clutch 28 is engaged while the remaining clutches are disengaged. With the clutch 28 engaged, the transfer shaft 60 is rotated in a forward direction thus rotating the first ratio input gear 66 in a forward direction. The first ratio output gear 54 is driven by the gear 66 in the direction to engage the one-way clutch 46 and therefor drive the transfer shaft 36.

As previously pointed out, the transfer shaft 36 will drive the output gear 48 which will, in turn, drive the gear 94 and the differential carrier 74. As is well known, this will result in rotation of the output shafts 90 and 92 and a speed greatly reduced from the speed of input shaft 24. However, the torque transmission will be increased.

To establish the second forward ratio, the clutch 40 is engaged while the clutch 28 remains engaged. Due to the meshing relationship between the gears 62 and 50, the transfer shaft 36 will be rotated at a speed greater than the first ratio speed, such that one-way clutch 46 will be driven in an overrunning condition, such that the first ratio gear set comprised of gears 54 and 66 will be inoperative. During the second gear ratio, the input speed to the differential 76 is increased, as compared to the first ratio, while the torque input is decreased for a given engine operating level.

To establish the third forward ratio, the clutches 42 and 40 are interchanged such that the third ratio input gear 64 and third ratio output gear 52 become operative to drive the transfer shaft 36. During this third ratio, the output speed is further increased while the torque is decreased at the given engine input level.

To establish the fourth forward ratio, the clutch 68 is engaged while the clutch 42 is disengaged, thereby providing a torque transmission path between the transfer shafts 60 and 36 via the fourth ratio gears 68 and 44. It should be appreciated that each of these forward ratios had benefit of the torque multiplication provided by the output gear set comprised of gears 48 and 94.

To establish the fifth and highest forward ratio, the direct clutch 70 is engaged while the clutch 68 is disengaged. During the fifth forward ratio, the torque transmission path is from the input shaft 24 through the forward clutch 28, the transfer shaft 60 and the direct clutch 70 to the differential carrier 74. Thus, in the fifth forward ratio, the final reduction is bypassed, thereby improving the overall transmission efficiency by reducing the number of tooth meshes present between the power input and the power output. The fifth forward ratio is determined by the chain and sprocket 22.

To establish the reverse drive ratio, clutch 34 is engaged while the remaining clutches are disengaged. Engagement of clutch 34 provides a torque transmission path from the input shaft 24 to the transfer shaft 36 via the reverse ratio gear set comprised of gears 26, 30 and 32. The reverse idler gear 30 causes the transfer shaft 36 to rotate in a direction which will provide a reverse output at the shafts 90 and 92. As with the first through fourth forward ratios, the final drive ratio of gears 48 and 94 is operable during reverse to provide a large torque multiplier and reduced speed ratio between the input shaft 24 and the output shafts 90 and 92.

By providing the coaxial relationship between the input shaft 24, transfer shaft 60 and the output shafts 90 and 92, the overall barrel size of the transmission is greatly reduced as is the number of bearing supports that must be formed in the transmission casing or any extension housings that are secured thereto. This unique coaxial arrangement also permits the direct connection between the transmission input shaft 24 and the differential carrier 74, thus eliminating the normal gear meshes found in conventional transmissions.

The gear and shafting arrangement disclosed herein also permits the differential to be rotatably disposed on the input axis which significantly reduces the overall size of the transmission which provides a more compact assembly and an efficient use of the materials, such as the casing. The input ratio to all of the gear ratios can be adjusted through judicious selection of the sprockets 56 and 58. The overall ratio of reverse gear and first through fourth forward gear can be adjusted by the judicious selection of the output gears 48 and 94.

The embodiments of the invention in which an exclusive property or privilege is claimed are defined as follows:

1. A power transmission comprising: input drive means; output drive means including a differential gear arrangement; an input shaft drivingly connected with said input drive means; a first transfer shaft coaxial with said input shaft; first clutch means for selectively connecting said input shaft to said first transfer shaft; a second transfer shaft disposed parallel to and noncoaxial with said input shaft and said first transfer shaft; reverse gear means operatively connected with said input shaft and said second transfer shaft including selectively engageable reverse clutch means for providing a reverse drive connection between said input shaft and said second transfer shaft; output gear means drivingly connecting said second transfer shaft with said differential gear arrangement; a plurality of gear pairs operatively connected between said first and second transfer shafts each including a selectively engageable clutch means for providing a plurality of drive ratios between said transfer shafts, said first clutch means being operable in combination with said plurality of gear pairs to selectively provide a plurality of drive ratios between said input means and said output means; and second clutch means for selectively connecting said first transfer shaft directly with said output means and cooperating with said first clutch means for providing a forward drive ratio between said input means and said output means.

2. A power transmission comprising: input drive means including an input shaft; output drive means including a differential gear arrangement having a carrier member, side gear means and a pair of output shafts coaxial with said input shaft; a first transfer shaft coaxial with said input shaft; first clutch means for selectively connecting said input shaft to said first transfer shaft; a second transfer shaft disposed parallel to and noncoaxial with said input shaft and said first transfer shaft; reverse gear means operatively connected with said input shaft and said second transfer shaft including selectively engageable reverse clutch means for providing a reverse drive connection between said input shaft and said second transfer shaft; output gear means drivingly connecting said second transfer shaft with said differential gear arrangement including a first output gear drivingly connected with said second transfer shaft and a second output gear mounted on said carrier and meshing with the first output gear; a plurality of gear pairs operatively connected between said first and second transfer shafts each including a selectively engageable clutch means for providing a plurality of drive ratios between said transfer shafts, said first clutch means being operable in combination with said plurality of gear pairs to selectively provide a plurality of drive ratios between said input means and said output means; and direct clutch means for selectively connecting said first transfer shaft directly with said carrier member in bypass relation with said output gear means and cooperating with said first clutch means for providing a forward drive ratio between said input means and said output means.

* * * * *